(12) United States Patent
Koukoumidis et al.

(10) Patent No.: US 10,250,532 B2
(45) Date of Patent: Apr. 2, 2019

(54) SYSTEMS AND METHODS FOR A PERSONALITY CONSISTENT CHAT BOT

(71) Applicant: Microsoft Technology Licensing, LLC, Redmond, WA (US)

(72) Inventors: Emmanouil Koukoumidis, Kirkland, WA (US); Joseph Johnson, Jr., Seattle, WA (US); Dustin I. Abramson, Bellevue, WA (US); Maria A. Rangel, Bellevue, WA (US); Ying Wang, Bellevue, WA (US); Di Li, Beijing (CN); Steven G. Zittrower, Kissimmee, FL (US); Hailong Mu, Redmond, WA (US); Kelli A. Stuckart, Seattle, WA (US); Hudong Wang, Bellevue, WA (US); Pengfei Hao, Redmond, WA (US); Donald F. Brinkman, Seattle, WA (US); Kati A. London, New York, NY (US); Zhan Chen, Tokyo (JP)

(73) Assignee: Microsoft Technology Licensing, LLC, Redmond, WA (US)

(*) Notice: Subject to any disclaimer, the term of this patent is extended or adjusted under 35 U.S.C. 154(b) by 109 days.

(21) Appl. No.: 15/581,116

(22) Filed: Apr. 28, 2017

(65) Prior Publication Data
US 2018/0316631 A1    Nov. 1, 2018

(51) Int. Cl.
| H04L 12/58 | (2006.01) |
| G06N 99/00 | (2010.01) |
| G06N 3/00  | (2006.01) |
| G06F 17/30 | (2006.01) |

(52) U.S. Cl.
CPC ........ *H04L 51/02* (2013.01); *G06F 17/30958* (2013.01); *G06N 3/006* (2013.01); *G06N 99/005* (2013.01)

(58) Field of Classification Search
CPC . H04L 51/02; G06F 17/30958; G06N 99/005; G06N 3/006
See application file for complete search history.

(56) References Cited

U.S. PATENT DOCUMENTS

| 6,442,450 B1 * | 8/2002 | Inoue | B25J 13/00 318/565 |
| 6,560,511 B1 * | 5/2003 | Yokoo | A63H 11/00 318/568.11 |

(Continued)

OTHER PUBLICATIONS

"Remember the Things You Easily Forget", http://web.archive.org/web/20170218023204/https:/wonder-bot.com/, Published on: Feb. 18, 2017, 3 pages.

(Continued)

*Primary Examiner* — Alina A Boutah

(57) ABSTRACT

Systems and methods for personality consistent automated chatting are provided. The systems and methods track the emotional state of the chat bot, track entity related dispositions of the chat bot and/or track the closeness of the relationship between the chat bot and a user. Accordingly, the systems and methods are able to provide consistent personality and/or points of view by generating replies based on the tracked chat bot emotional state, chat bot entity dispositions, and/or the relationship closeness between the chat bot and the user.

20 Claims, 12 Drawing Sheets

(56) References Cited

U.S. PATENT DOCUMENTS

| | | | | |
|---|---|---|---|---|
| 7,065,490 | B1* | 6/2006 | Asano | G10L 13/033 318/568.12 |
| 7,266,499 | B2 | 9/2007 | Surace et al. | |
| 7,920,682 | B2 | 4/2011 | Byrne et al. | |
| 8,719,200 | B2 | 5/2014 | Beilby et al. | |
| 8,826,129 | B2* | 9/2014 | DeLuca | G06F 9/451 715/706 |
| 8,949,725 | B1* | 2/2015 | Goncharuk | G06Q 10/107 715/758 |
| 9,008,283 | B2 | 4/2015 | Riahi et al. | |
| 9,177,053 | B2 | 11/2015 | Myslinski | |
| 2001/0021882 | A1* | 9/2001 | Hosonuma | B25J 9/1674 700/245 |
| 2004/0093121 | A1* | 5/2004 | Schurmann | G06N 3/004 700/245 |
| 2008/0059570 | A1* | 3/2008 | Bill | G06Q 10/10 709/203 |
| 2008/0269958 | A1* | 10/2008 | Filev | B60W 50/10 701/1 |
| 2011/0144804 | A1 | 6/2011 | Song et al. | |
| 2012/0041903 | A1* | 2/2012 | Beilby | G06N 3/004 706/11 |
| 2015/0248620 | A1* | 9/2015 | Liden | G06N 3/006 706/46 |
| 2016/0044380 | A1 | 2/2016 | Barrett | |
| 2016/0171387 | A1 | 6/2016 | Suskind | |
| 2016/0306844 | A1 | 10/2016 | Frank et al. | |
| 2017/0286755 | A1* | 10/2017 | Kaletsky | G06F 17/24 |
| 2018/0026925 | A1* | 1/2018 | Kennedy | H04L 51/20 715/753 |
| 2018/0090137 | A1* | 3/2018 | Horling | G10L 15/1815 |
| 2018/0101776 | A1* | 4/2018 | Osotio | G06N 5/04 |
| 2018/0150739 | A1* | 5/2018 | Wu | G06F 17/271 |
| 2018/0174020 | A1* | 6/2018 | Wu | G06N 3/006 |
| 2018/0196796 | A1* | 7/2018 | Wu | G06F 17/279 |
| 2018/0287968 | A1* | 10/2018 | Koukoumidis | G06F 17/30867 |
| 2018/0293483 | A1* | 10/2018 | Abramson | G06N 3/006 |

OTHER PUBLICATIONS

Oremus, Will, "Facebook Thinks it Has Found the Secret to Making Bots Less Dumb", http://www.slate.com/blogs/future_tense/2016/06/28/facebook_s_ai_researchers_are_making_bots_smarter_by_giving_them_memory.html, Published on: Jun. 28, 2016, 5 pages.

"Memory Bot", https://www.producthunt.com/posts/memory-bot, Retrieved on: Feb. 27, 2017, 5 pages.

Khorozov, Anatoly, "How Chatbots Can Automate and Enhance Customer Communications", https://chatbotsmagazine.com/how-chatbots-can-automate-and-enhance-customer-communications-a732bdcf5c03, Retrieved on: Feb. 27, 2017, 6 pages.

Microsoft Cognitive Services, "Entity Linking Intelligence Service", obtained online on Mar. 27, 2017 at: https://www.microsoft.com/cognitive-services/en-us/entity-linking-intelligence-service, 4 pages, 2016.

Prakash, Abhay et al., "Emulating Human Conversations using Convolutional Neural Network-based IR", NEU-IR 2016 SIGIR Workshop on Neural Information Retrieval, Jul. 21, 2016, Pisa, Italy, 5 pages.

Roberts, Kirk et al., "EmpaTweet: Annotating and Detecting Emotions on Twitter", Human Language Technology Research Institute, University of Texas at Dallas, Proceedings of LREC 2012, 8 pages.

* cited by examiner

SYSTEMS AND METHODS FOR A PERSONALITY CONSISTENT CHAT BOT

BACKGROUND

Bots are becoming more and more prevalent and are being utilized for more and more different tasks. Bots may be software applications that run automated tasks over a network, such as the Internet. Chat bots may be designed to conduct a conversation with a user via text, auditory, and/or visual methods to simulate human conversation. A chat bot may utilize sophisticated natural language processing systems or scan for keywords from a user input and then pull a reply with the most matching keywords or the most similar wording pattern from a database.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for personality consistent automated chatting. The systems and methods as disclosed herein track the emotional state of the chat bot, track entity related dispositions of the chat bot and/or track the closeness of the relationship between the chat bot and a user. Accordingly, the systems and methods as disclosed herein are able to provide consistent personality and/or points of view by generating replies based on the tracked chat bot emotional state, chat bot entity dispositions, and/or the relationship closeness between the chat bot and the user.

One aspect of the disclosure is directed to a system for a personality consistent chat bot. The system includes at least one processor and a memory. The memory encodes computer executable instruction that, when executed by the at least one processor, are operative to:
 identify that a first reply is warranted from the chat bot regarding a first entity to a user;
 search an entity-based disposition memory graph for the chat bot based on the first entity in response to identifying that the first reply is warranted;
 identify that the entity-based disposition memory graph does not include the first entity;
 extracting a user disposition for the first entity from user information in response to identifying that the entity-based disposition memory graph does not include the first entity;
 select a chat bot disposition that is similar to the user disposition for the first entity;
 generate the first reply about the first entity based on the chat bot disposition for the first entity;
 provide the first reply to the user;
 update the entity-based disposition memory graph to include the first entity and the chat bot disposition for the first entity to form an updated entity-based disposition memory graph for the chat bot;
 identify that a second reply is warranted from the chat bot regarding the first entity to the user;
 search the updated entity-based disposition memory graph for the chat bot based on the first entity in response to identifying that the second reply is warranted;
 identify the chat bot disposition for the first entity that was previously provided by the chat bot based on the search of updated entity-based disposition memory graph;
 generate the second reply about the first entity based on the chat bot disposition for the first entity; and
 provide the second reply to the user.

A further aspect of the disclosure includes a method for automated chatting with personality consistency. The method includes:
 identifying that a first reply is warranted from a chat bot regarding a first entity to a user;
 searching an entity-based disposition memory graph for the chat bot based on the first entity;
 identifying a chat bot disposition for the first entity that was previously provided by the chat bot based on the searching of the entity-based disposition memory graph for the chat bot;
 generating the first reply about the first entity based on the chat bot disposition for the first entity; and
 providing the first reply to the user.

Yet another aspect of the disclosure is directed to a system for a personality consistent chat bot. The system includes at least one processor and a memory. The memory encodes computer executable instruction that, when executed by the at least one processor, are operative to:
 track an emotional state of the chat bot;
 form an emotional state memory graph for the chat bot based on the tracking of the emotional state of the chat bot;
 identify that a reply is warranted from a chat bot;
 search the emotional state memory graph for the chat bot in response to identifying that the reply is warranted;
 identify a current emotional state of the chat bot based on the searching of the emotional state memory graph;
 generate the reply based on the emotional state of the chat bot; and
 provide the reply to a client computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
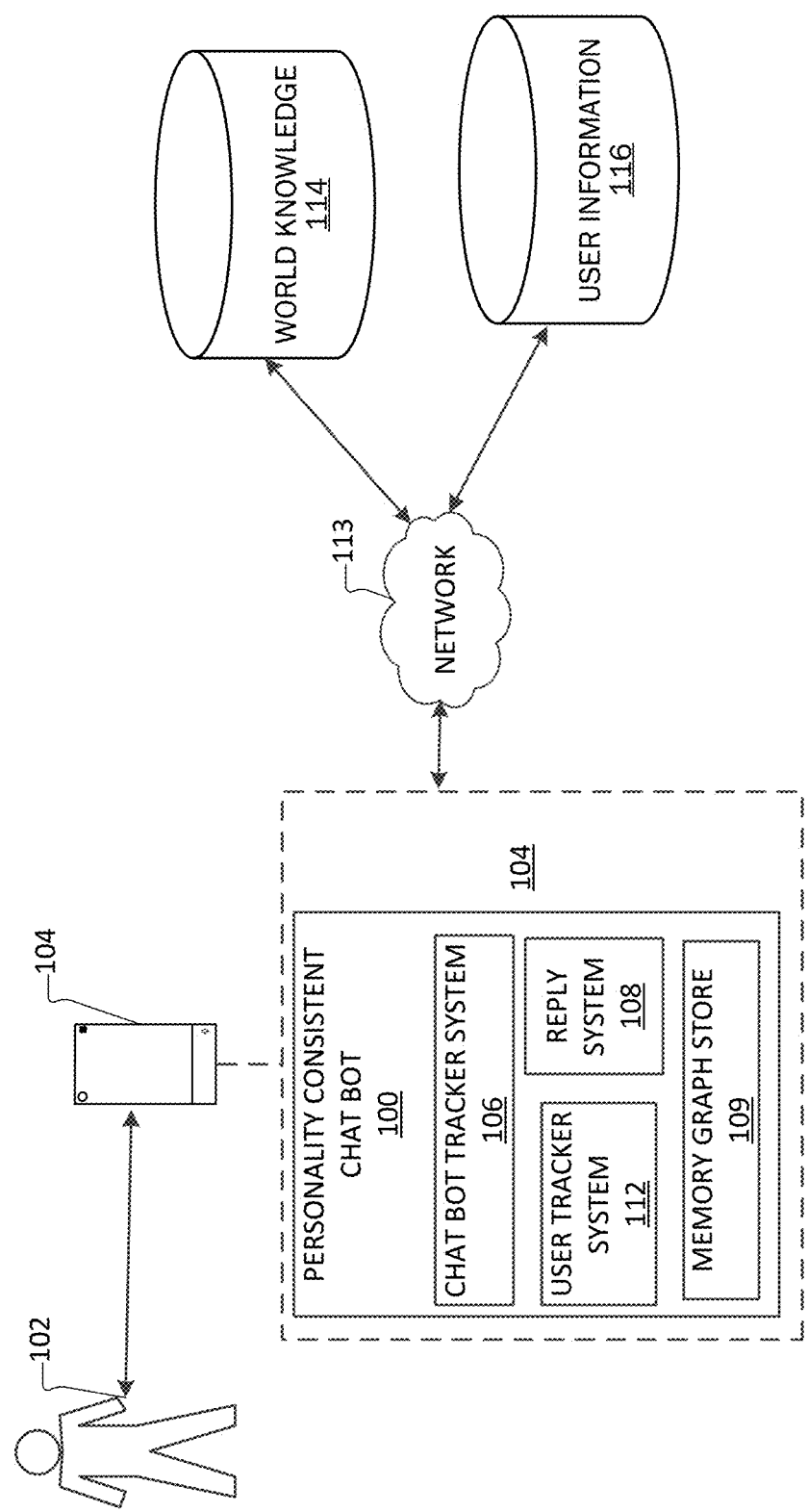
FIG. 1A is a schematic diagram illustrating a personality consistent chat bot being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

As understood by those skilled in the art, bots may be software applications that run automated tasks over a network, such as the Internet. In some aspects, a chat bot is a module on an application, such as a digital assistant. Chat bots are designed to conduct a conversation with a user via auditory or visual methods to simulate human conversation. However, chat bots often have an inconsistent personality and can't recall prior provided preferences.

For example, currently utilized chat bots may infer a disposition for a reply based on current conversation context or based on extracted current user disposition from known user information. While these previously utilized chat bots are able to infer general likes and dislikes of the user to perform general conversation, these previously utilized chat bots are unable to track and maintain the chat bot's emotional state and/or disposition towards a given entity from one reply to the next and from one day to the next. As such, the likes and dislikes of the chat bot will vary depending upon current conversation context and/or the user's current disposition. For example, the chat bot may say that it likes pizza during one conversation and then state that the chat bot dislikes pizza in a conversation the next day. Further, the chat bot may appear to be happy in a reply and then appear sad two replies later. This personality inconsistency disrupts the flow of the conversation, reminds the user that the chat bot is an automated application, and reduces trust and engagement with the chat bot.

The systems and methods as disclosed herein are directed to providing personality consistency during automated chatting. The systems and methods as disclosed herein track the emotional state of the chat bot, track entity related dispositions of the chat bot and/or track the closeness of the relationship between the chat bot and a user. Accordingly, the systems and methods as disclosed herein are able to provide consistent personality and/or points of view by generating replies based on the tracked chat bot emotional state, entity dispositions, and/or the relationship closeness.

The ability of the systems and methods described herein to provide personality consistent automated chatting provides for a fun, more engaging, and easier to use chat bot when compared to previously utilized chat bots that did not provide personality consistent automated chatting. Additionally, the ability of the systems and methods described herein to provide personality consistent automated chatting improves the usability, improves the conversation flow, improves the performance, improves user engagement, improves user trust, and/or improves user interactions with a chat bot when compared to chat bots that do not provide personality consistent automated chatting.

FIGS. 1A-1D illustrate different examples of a personality consistent chat bot 100 being utilized by a user 102 via a client computing device 104, in accordance with aspects of the disclosure. The personality consistent chat bot 100 is capable of tracking and storing the chat bot's emotional state, chat bot's entity dispositions, and/or the closeness of a relationship between the chat bot 100 and the user 102. The personality consistent chat bot 100 utilizes one or more of these tracked information to generate each reply to provide personality consistent and/or view point consistent chatting. Accordingly, the personality consistent chat bot 100 is a fun, an easy-to-use, an effective, and an engaging personality consistent chat bot 100.

Figure 1B:
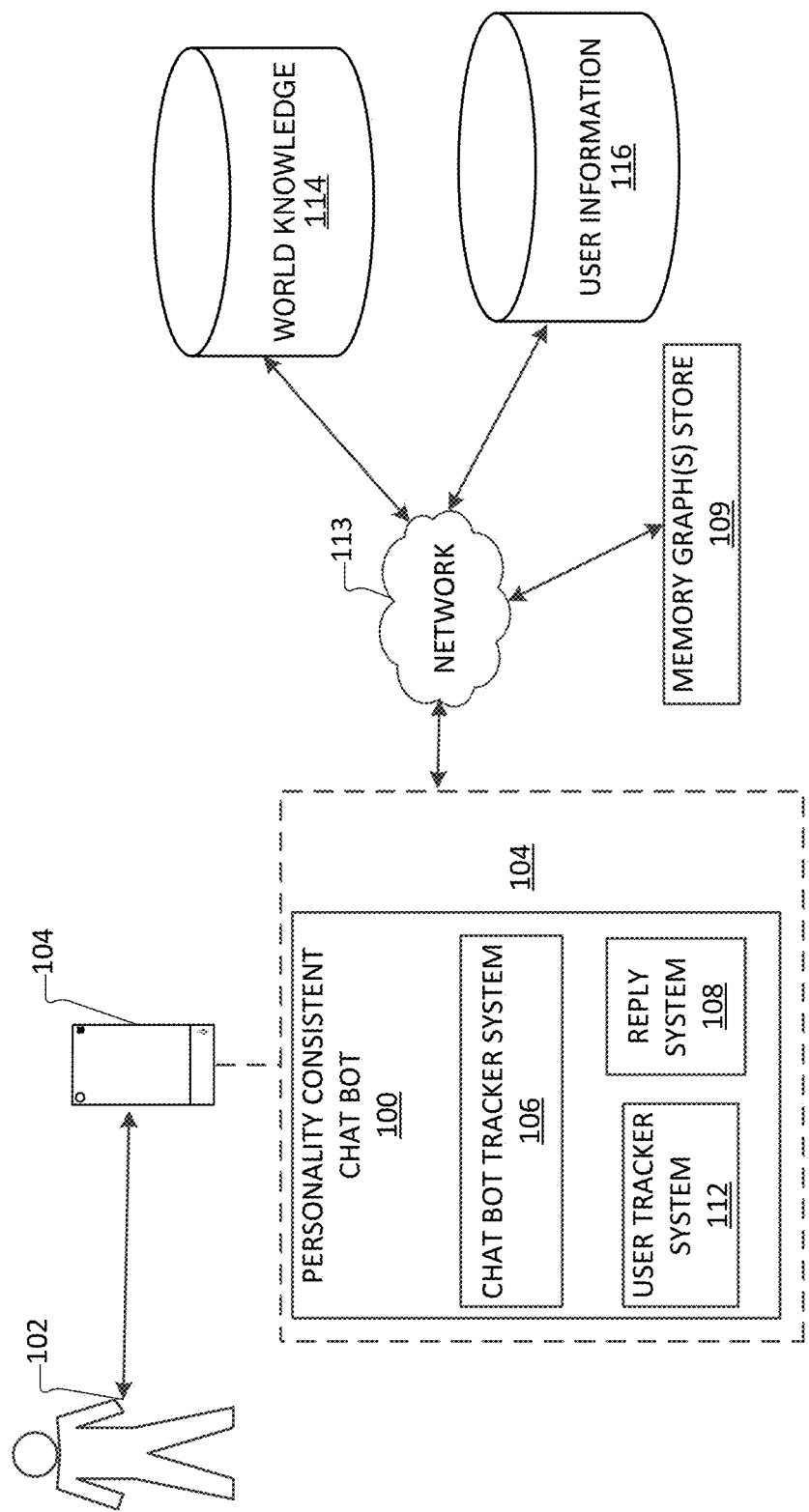
FIG. 1B is a schematic diagram illustrating a personality consistent chat bot being utilized by a user via a client computing device, in accordance with aspects of the disclosure.
Figure 1C:
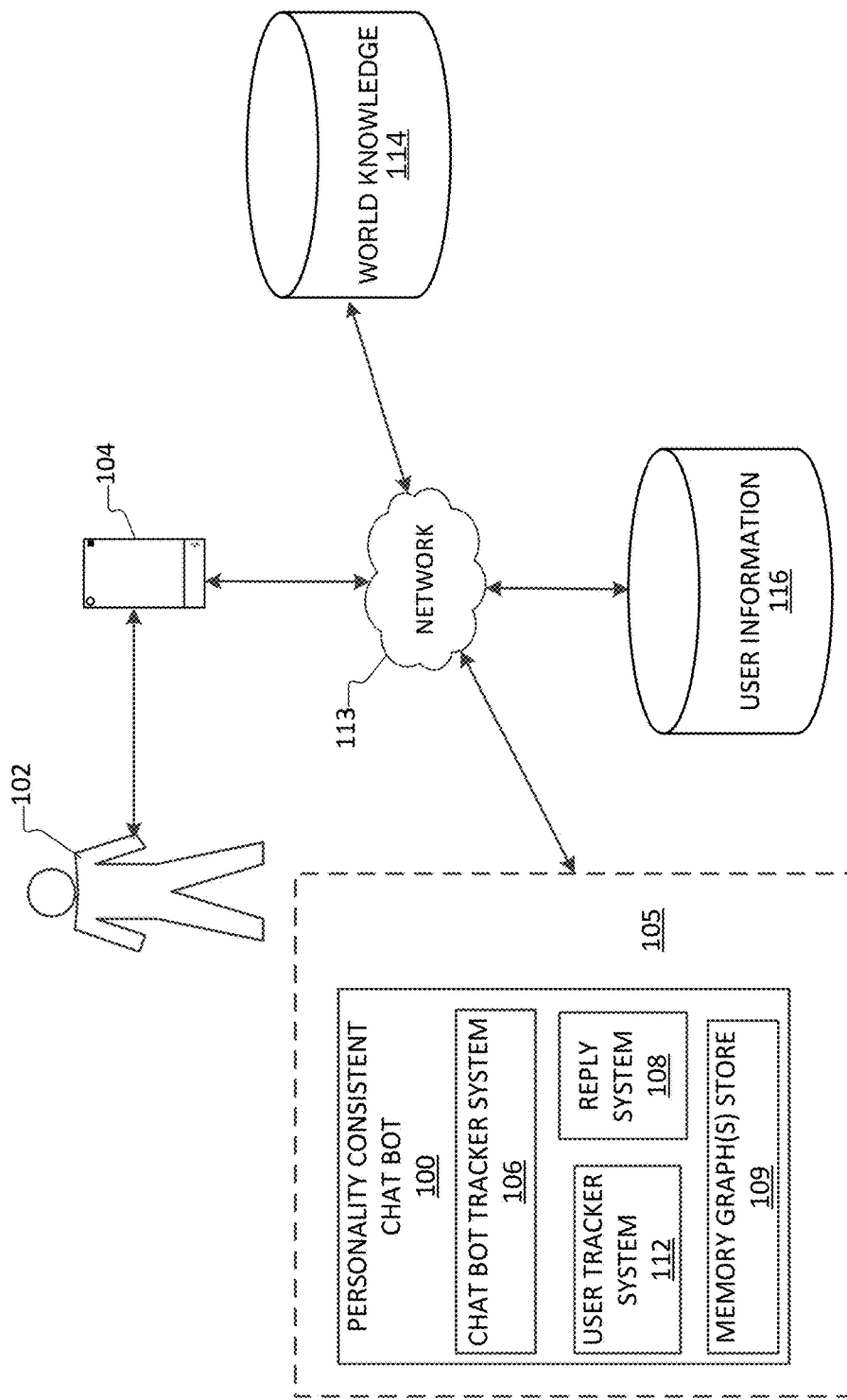
FIG. 1C is a schematic diagram illustrating a personality consistent chat bot being utilized by a user via a client computing device, in accordance with aspects of the disclosure.
Figure 1D:
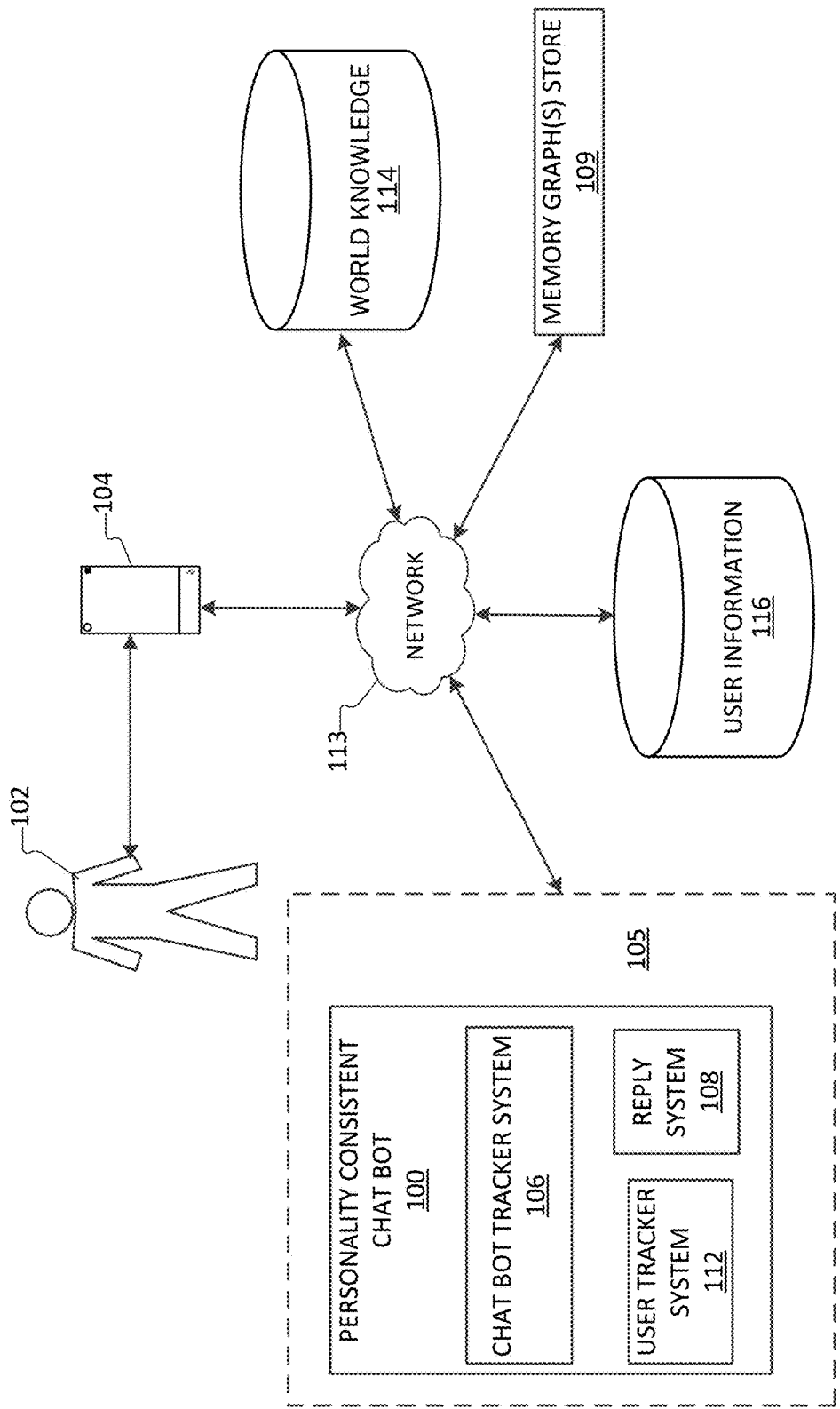
FIG. 1D is a schematic diagram illustrating a personality consistent chat bot being utilized by a user via a client computing device, in accordance with aspects of the disclosure.

The personality consistent chat bot 100 includes a chat bot tracker system 106, a reply system 108, and/or a user tracker system 112. In some aspects, the personality consistent chat bot 100 also includes a memory graph store 109 as illustrated in FIGS. 1A and 1C. In other aspects, the memory graph store 109 is not part of the personality consistent chat bot 100 and is separate and distinct from the personality consistent chat bot 100 as illustrated in FIGS. 1B and 1D. In these aspects, the personality consistent chat bot 100 communicates with the memory graph store 109 through a network 113. In some aspects, the network 113 is a distributed computing network, such as the internet. The personality consistent chat bot 100 may also communicate with world knowledge 114 and/or user information 116 through a network 113. In some aspects, the world knowledge 114 and/or the user information 116 are one or more databases.

In some aspects, the personality consistent chat bot 100 is implemented on the client computing device 104 as illustrated by FIGS. 1A and 1B. In a basic configuration, the client computing device 104 is a computer having both input elements and output elements. The client computing device 104 may be any suitable computing device for implementing the personality consistent chat bot 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the personality consistent chat bot 100 may be utilized.

Figure 2:
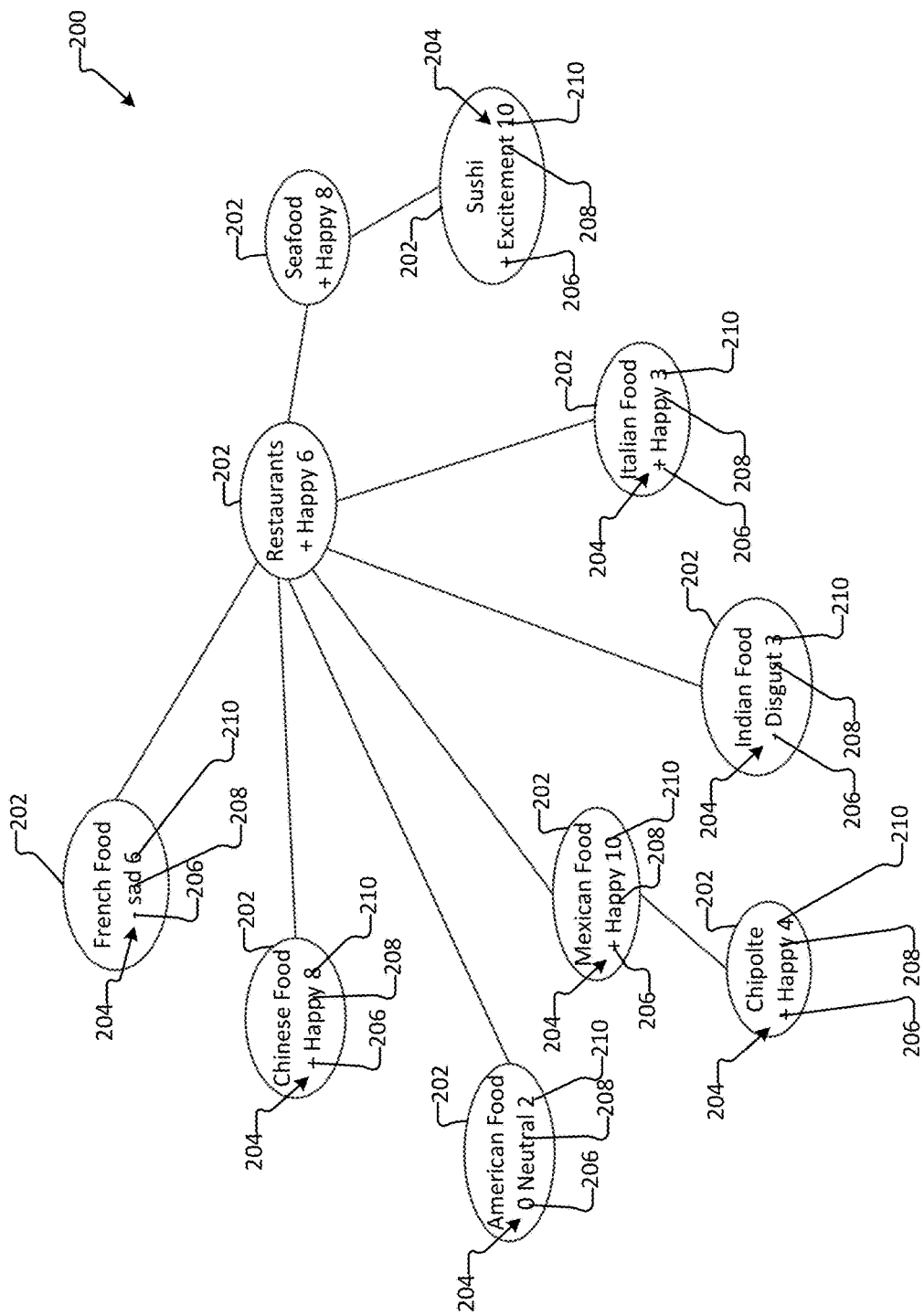
FIG. 2 a schematic diagram illustrating a portion of an example entity-based disposition memory graph for a chat bot, in accordance with aspects of the disclosure.

In other aspects, the personality consistent chat bot 100 is implemented on a server computing device 105, as illustrated in FIG. 2. The server computing device 105 may provide data to and/or receive data from the client computing device 104 through a network 113. In further aspects, that personality consistent chat bot 100 is implemented on more than one server computing device 105, such as a plurality or network of server computing devices 105. For example, the chat bot tracker system 106 may be located on the same server 105 as the reply system 108 as illustrated in FIGS. 1A-1C or may be located on separate servers 105. In some aspects, the personality consistent chat bot 100 is a hybrid system with portions of the personality consistent chat bot 100 on the client computing device 104 and with portions of the personality consistent chat bot 100 on one or more server computing devices 105.

The chat bot tracker system 106 of the personality consistent chat bot 100 tracks chat bot entity disposition, chat bot emotional state, and/or the closeness of the relationship between the chat bot and the user. The entity disposition as utilized herein refers to a sentiment (i.e., positive, negative, or neutral) about the entity, an emotion associated with the entity (i.e., happy, sad, neutral, angry, disgust, contempt, fear, excitement, etc.), and/or a strength of the identified sentiment or emotion. As such, the disposition may be represented or indicated based on a sentiment label, an emotion label, and/or a strength label. The strength may be represented by a numerical value or scores, such as 0-1, 1-5, 1-10, 1-20, etc. The strength indicates how strongly or intensely the chat bot feels about the identified sentiment and/or emotion. The emotional state of the chat bot refers to the overall general mood and/or health of the chat bot (i.e., happy, sad, neutral, angry, disgust, contempt, fear, excitement, healthy, sick, injured, etc.). The chat bot tracker system 106 of the personality consistent chat bot 100 updates, maintains, and/or creates an entity-based disposition memory graph for the chat bot 100, an emotional state memory graph or log for the chat bot 100, and/or a relationship state graph or log based on the tracked information.

In some aspects, the creator of the chat bot 100 preconfigures certain personality aspects, emotional states, and/or entity dispositions into the chat bot 100. In these aspects, the chat bot 100 includes an entity-based disposition memory graph for the chat bot, an emotional state memory graph for the chat bot, and/or a relationship state graph or log that is preconfigured with information from the creator. For example, the creator may preconfigure the chat bot to be happy, healthy, and like puppies. In this example, the entity-based disposition memory graph may be preconfigured to include the entity of puppies with a disposition that includes a sentiment label of positive, an emotion label of excitement, and an associated strength label of ten. The emotional state graph may list the current state of the chat bot as a happy and healthy. During use, the entity-based disposition memory graph for the chat bot 100 is updated or added to as the chat bot 100 provides more and more opinions or dispositions about entities in replies to the user 102. The emotional state memory graph of the chat bot 100 is also updated as the emotional state of the chat bot 100 changes or evolves over time based on the chat bot's interactions with the user. The closeness of the relationship between the user and the chat bot is also updated as new chat bot replies and/or user inputs are received.

In other aspects, the chat bot 100 is created without any entity dispositions and/or emotional states. In these aspects, chat bot tracker system 106 creates or builds the entity-based disposition memory graph and/or the emotional state memory graph or log for the chat bot 100 from scratch based on the chat bot provided replies.

In some aspects, the chat bot tracker system 106 collects chat bot replies and extracts emotional state, entities, and/or entity dispositions from the replies. The term "collect" as utilized herein refers to the passive receiving or receipt of data and/or to the active gathering or retrieval of data. A chat bot reply is any communication provided by the chat bot 100 to a user 102 via any medium. In further aspects, the chat bot tracker system 106 infers additional emotional states and/or entity disposition for the chat bot 100 based on world knowledge 114 given previously provided or preconfigured emotional states and entity dispositions by the chat bot 100. In these aspects, the chat bot tracker system 106 updates or adds any inferred entity disposition to the entity-based disposition memory graph for the chat bot 100 and/or updates or adds any inferred emotional states to the emotional state memory graph or log.

In further aspects, the chat bot tracker system 106 determines and tracks the closeness of the relationship between the chat bot 100 and the user 102. This relationship closeness is stored by the chat bot tracker system 106. The chat bot tracker system 106 updates the relationship closeness based on the user's engagement and conversation history with the chat bot 100. Accordingly, the chat bot tracker system 106 also collects user engagement rate with the chat bot 100 and user inputs to the chat bot 100 in addition to the chat bot replies to determine the relationship closeness. The relationship closeness may be shown based on a numerical scale or a word scale. For example, the closeness may be acquaintance, new friends, good friends, best friends, family, and etc. In another example, the closeness may be shown by a numerical score such as 1 to 5 with 1 being the most distant and 5 being the closest. The closeness of the relationship between the user 102 and the chat bot 100 increases as engagement rate increase, time of use (use of application for one month versus one year), and how personal the conversation topics are that discussed, such as space travel versus relationship status. Accordingly, the chat bot 100 monitors and/or analyzes each of these inputs and determines and stores a relationship closeness.

In some aspects, the entity-based disposition memory graph, the emotional state memory graph or log, and/or the relationship closeness are stored or saved in the memory graph store 109. The memory graph store 109 may be one or more databases. As discussed above, the memory graph store 109 may be part of the personality consistent chat bot 100 or may be separate and distinct component from the personality consistent chat bot 100.

In some aspects, the personality consistent chat bot 100 includes a user tracker system 112. The user tracker system 112 tracks user entity dispositions and/or a user emotional state. In some aspects, the user tracker system 112 of the personality consistent chat bot 100 updates, maintains, builds, and/or creates a user entity-based disposition memory graph and/or a user emotional state memory graph or log based on the tracked information, such as user information 116. The user information may be any information available in the user information database 116 or may be based on information about the user collected by the user tracker system 112. The information about the user may include user inputs provided to the personality consistent chat bot 100. In some aspects, the user tracker system 112 collects user inputs and extracts emotional state, entities, and/or entity dispositions from the inputs, user information, or other collected information. A user input is any communication provided by the user 102 to the chat bot 100 via any medium. In further aspects, the user tracker system 112 infers additional emotional states and/or entity disposition for the user 102 based on world knowledge 114 given previously provided emotional states and entity dispositions of the user 102. In these aspects, the user tracker system 112 updates or adds any inferred entity disposition to the user entity-based disposition memory graph and/or updates or adds any inferred user emotional states to the user emotional state memory graph or log. In some aspects, the user entity-based disposition memory graph and/or the user emotional state memory graph or log are stored or saved in the memory graph store 109. In some aspects, a change in a user entity disposition and/or user emotional state is detected by the user tracker system 119. This detected change may be collected by the reply system 108.

The reply system 108 of the personality consistent chat bot 100 analyzes input from the user and determines if a chat bot reply is warranted. If the reply system 108 determines that a reply is warranted, the reply system 108 generates a reply to provide to the user. However, to provide personality consistency, the reply system 108 collects any relevant chat bot entity dispositions, the chat bot emotional state, and/or the relationship closeness and generates a reply based on this collected information.

In other aspects, the reply system 108 analyzes a collected change in user disposition and/or user emotional state and determines if a reply is warranted based on this detected change. In these aspects, if the reply system 108 determines that reply is warranted, the reply system 108 generates a reply inquiring about the change in user disposition and/or user emotional state. In these aspects, if the reply system 108 determines that a reply is not warranted, the reply system 108 does not generate a reply about the detected change.

The reply system 108 may identify that an entity is related to the reply. Based on this identification, the reply system 108 may search the entity-based disposition memory graph for the chat bot 100 for the identified entity. If the entity is found on the entity-based disposition memory graph, the disposition of the chat bot for that entity is collected by the reply system 108 and utilized when generating the response. For example, if the entity is puppies and the chat bot 100 has previously provided a reply that the chat bot loves puppies, the entity-based disposition memory graph will contain the entity puppies with a disposition of positive (sentiment), happy (emotion), and a strength (of the emotion) of 10. The reply system 108 collects this puppy disposition and when generating a reply about puppies provides a consistent disposition about puppies in the new reply being generated.

If the entity is not included in the entity-based disposition memory graph for the chat bot, the reply system 108 may select a disposition at random, select a disposition for the entity that is similar to the user's disposition for that same entity based on a search of user information 116, and/or select a disposition that is similar to the most common disposition for that entity based on a search of world knowledge 114. The user information 116 is any known information about the user 102, such as past user inputs to the chat bot 100, collected user information from the client computing devices 104, information collected about the user 102 from world knowledge 114, etc. While the user information 116 is shown as a separate and distinct component from the personality consistent chat bot 100 in the figures, in some aspects, the user information 116 may be part of the personality consistent chat bot 100. The world knowledge includes any information available to the chat bot 100 via the network 113, such as accessible knowledge graphs and/or other information that can be retrieved via a search engine other modality. For example, the world knowledge 114 may contain known knowledge graphs for movies, restaurants, food, locations, animals, etc. In other examples, the world knowledge 114 may contain generalized entity likes or dislikes, such as most people in a specific geographic region generally like sunny days and dislike rainy days. In another aspect, the world knowledge 114 includes a database of sentiments/emotions of users for a set of entities. If the chat bot 100 needs to express a *consistent* sentiment/emotion about an entity that is not in the memory graph, in some aspects, the chat bot 100 may apply techniques typically used by a recommendation systems (e.g., content-based inference, user-based inference, and/or collaborative filtering) to determine if the chat bot 100 should like or dislike an entity not in the memory graph. For example, if the chat bot 100 likes X, Y and Z but dislikes W, then the chat bot 100 could infer that the chat bot 100 should also like V. This inference is done with collaborative filtering, content-based inference, user-based inference, and/or other approaches that may be used for generating recommendations.

For example, if the entity is puppies and entity-based disposition memory graph for the chat bot does not include the entity puppies or any disposition for puppies, the reply system 108 may select a disposition at random and imply that the chat bot mildly dislikes puppies in the provided reply. In an alternative example, if the entity is puppies and entity-based disposition memory graph for the chat bot does not include the entity puppies or any disposition for puppies, the reply system 108 may search a user entity-based disposition memory graph to determine that the user 102 has a positive (sentiment) for puppies and therefore may generate a reply with a positive sentiment for puppies. In yet another example, if the entity is puppies and entity-based disposition memory graph for the chat bot does not include the entity puppies or any disposition for puppies, the reply system 108 may search world knowledge 114 to determine that people generally have a positive (sentiment) for puppies and, therefore, may generate a reply with a positive sentiment for puppies. In further aspects, both the user entity disposition and the general population entity disposition from a search of user information and world knowledge are utilized to select the entity disposition for the chat bot 100.

In some aspects, the reply system 108 may also collect any relevant user entity dispositions and/or the user emotional state and generates the reply based additionally on this collected user information. In some aspects, the emotional state of the generated chat bot reply is based solely on the chat bot's emotional state regardless of the user's emotional state. In other aspects, the emotional state of the generated response is based on an averaged or some other mathematical combination of the user's emotional state and the chat bot's emotional state. For example, if the user's emotional state is that the user is sad with a strength of 10 because the user's friend passed away, even if the chat bot's emotional state is happy, an overly happy response by the chat bot 100 may be inappropriate given the user's current emotional state. As such, in this example, the reply system 108 may combine the user's and chat bot's emotional states and provide a reply with a natural emotional state to the user 102. In other aspects, the emotional state of the generated response is based solely on the chat bot's emotional state regardless of the user's emotional state.

In some aspects, the entity disposition of the generated chat bot reply is based solely on the chat bot's entity disposition regardless of the user's entity disposition. In other aspects, the emotional state of the generated response is based on an averaged or some other mathematical combination of the user's entity disposition and the chat bot's entity disposition. In alternative aspects, the reply system 108 determines a difference between a user's entity disposition and the chat bot's entity disposition. In these aspects, the reply system 108 compares the difference to a threshold. If the difference does not meet the threshold, the reply system 108 generates the reply based solely on the chat bot entity disposition.

In some aspects, if the difference meets the threshold, the reply system 108 may modify the entity disposition in the reply to be closer towards the user's entity disposition. In other aspects, if the difference meets the threshold, the reply system 108 may modify the disposition for the entity to be closer to, but not the same as the user disposition for the entity after providing a predetermined number of replies regarding the entity or after a predetermine amount of time. As such, the chat bot's entity disposition will appear to change gradually over time instead of changing abruptly. In other aspects, if the difference meets the threshold, the reply system 108 may gradually modify the disposition for the entity to be closer to the user disposition for the entity after providing a predetermined number of replies regarding the entity or after a predetermine amount of time. As such, the chat bot's entity disposition will appear to change gradually over time until the chat bot's disposition is the same as the user's disposition for this entity instead of changing abruptly.

For example, if the user's disposition toward pets includes an emotional label of disgust with a strength of 10, and the chat bot's inferred disposition includes an emotional label of happy with a strength of 8 based on a previously provided chat bot reply regarding puppies, the reply system 108 may gradually change the chat bot's disposition towards pets and/or puppies to be closer to the users after a predetermined number of replies or after a predetermined amount of time. As such, in this example, the reply system 108 may determine that the difference between the user's disposition for pets and the chat bot's disposition for pets meets a threshold and then generate a reply about pets based on the current chat bot disposition that included an emotional label of happy with a strength of 8, but may generate a reply regarding pets in six months that has an emotional label of neutral with a strength of 5 to gradually modify the disposition of the chat bot regarding pets toward the disposition of the user 102.

Once the reply is provided, as discussed above, the chat bot tracker system 106 collects the reply, analyzes the reply, and determines if the emotional state memory graph or log for the chat bot, relationship closeness, and/or the entity-based disposition memory graph for the chat bot needs to be added to or updated based on the provided chat bot response. Based on the example above regarding the chat bot's disposition about pets, the chat bot tracker system 106 would collect the chat bot reply that has an emotional label of neutral with a strength of 5 for the entity of pets and change the entity-based disposition memory graph for the chat bot to match this most recently provided reply. As such, the updated entity-based disposition memory graph for the chat bot would include the entity of pets with a disposition that includes an emotion label of neutral with a strength of 5.

Similarly, if the reply system 108 adjusts the emotional state of the chat bot based on the emotional state of the user, the chat bot tracker system 106 updates the emotional state memory graph or log to show new emotional state of the bot based on the last provided reply. In some aspects, the chat bot tracker system 106 updates the emotional state memory graph or log for a given number of replies and/or a predetermined amount of time based on the new emotional state of the chat bot 100 based on the last provided reply. In these aspects, the emotional state of the chat bot will go back to a previous emotional state after the given number of replies and/or a predetermined amount of time. In these aspects, the chat bot 100 only changes the emotional state of the chat bot permanently in response to a user emotional state meeting an emotional state threshold for a predetermine number of inputs and/or a predetermine amount of time.

The reply system 108 may utilized the relationship closeness to make sure that the content of the reply is appropriate based on the relationship closeness. As such, the formality of the language and/or topics discussed may be controlled or filtered based on the relationship closeness by the reply system 108. For example, the chat bot 100 will not ask the user 102 about his relationship status if the relationship closeness is newly acquainted, but would ask the user 102 about his relationship status if the relationship closeness is good friend.

FIG. 2 is a schematic diagram illustrating a portion of an example entity-based disposition memory graph 200 for a personality consistent chat bot 100, in accordance with aspects of the disclosure. FIG. 2 shows the portion of the entity-based disposition memory graph 200 for the chat bot 100 that relates to the entity 202 of restaurants and to entities 202 that show different kinds of food. The disposition 204 for each entity is shown with a sentiment label 206, an emotion label 208, and an associated strength label 210 for the emotion label 208. However, in some aspects, the disposition 204 may include only a sentiment label 206 or an emotion label 208 for one or more entities 202 in the entity-based disposition memory graph 200 for the chat bot 100. In other aspects, the strength 210 may be associated with the sentiment label 206 for one or more entities 202 in the entity-based disposition memory graph 200 for the chat bot 100. In further aspects, a strength 210 may not be provided for one or more entities 202 in the entity-based disposition memory graph 200 for the chat bot 100. As illustrated in FIG. 2, the chat bot 100 has provided replies regarding restaurants and several different food types. The chat bot tracker system 106 collected the replies, analyzed the replies, and identifies entities 202 and chat bot dispositions 204 for the identified entities 202. Accordingly, the chat bot tracker system 106 updated the entity-based disposition memory graph 200 for the chat bot 100 with these identified entities 202 and chat bot dispositions 204.

The sentiment label 206 of the disposition 204 is represented by a negative (−), positive (+), or neutral (0). Any suitable system, logic, or learning module may be utilized by the chat bot tracker system 106 and/or user tracker system 112 for determining a sentiment for an entity 202. For example, the entity recognizer and the sentiment analyzer provided in Microsoft's cognitive services API could be used to extract the mentioned entities as well as the sentiment.

The emotion label 208 of the disposition 204 is represented by an emotion, such as happy, sad, neutral, contempt, disgust, angry, excitement, etc. Any suitable system, logic, or learning module may be utilized by the chat bot tracker system 106 and/or user tracker system 112 for determining a sentiment for an entity 202. For example, algorithms such as the one disclosed in the article entitled, "EmpaTweet: Annotating and Detecting Emotions on Twitter," which can be located at http://www.hlt.utdallas.edu/~kirk/publications/robertsLREC2012_2.pdf, may be used by or modified for use by the chat bot tracker system 106 and/or user tracker system 112 to detect emotions.

The strength label 210 for the emotion label 208 and/or sentiment label 206 of the disposition 204 is represented by a numerical scale 1-10, with 1 being the least strong and 10 being the most strong. Any suitable system, logic, or learning module may be utilized by the chat bot tracker system 106 and/or user tracker system 112 for determining a strength for a sentiment label 206 and/or emotion label 208 for an entity 202. For example, Microsoft's sentiment analyzer (Cognitive Services API) provides not only the polarity of the sentiment but also the strength.

Figure 3:
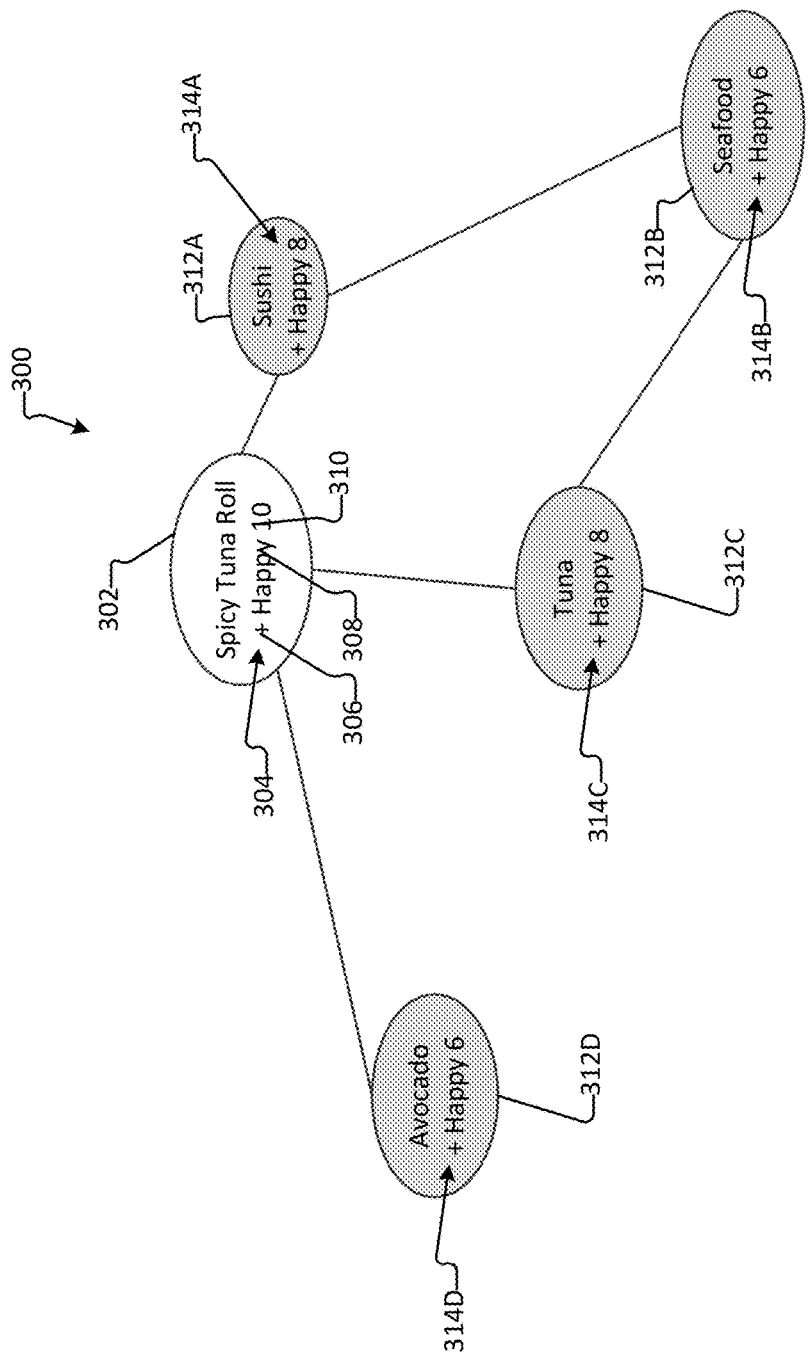
FIG. 3 is schematic diagram illustrating a portion of an example entity-based disposition memory graph for a chat bot with inferred chat bot dispositions for entities related to a spicy tuna roll entity, in accordance with aspects of the disclosure.

FIG. 3 is schematic diagram illustrating a portion of an example entity-based disposition memory graph 300 for a chat bot 100 with inferred chat bot dispositions 314 for entities 312 related to a spicy tuna roll entity 302, in accordance with aspects of the disclosure. FIG. 3 shows the portion of the entity-based disposition memory graph 300 for the chat bot 100 that includes the entity 302 of spicy tuna roll and the chat bot disposition 304 for the spicy tuna roll entity 202. The chat bot tracker system 106 identified the spicy tuna roll entity 302 from a previously provided chat bot reply and determined the chat bot disposition 304 (sentiment label "positive" 306, emotion label, "Happy" 308, and emotion strength label, "10" 310) for the spicy turn roll entity 302. Based on this entity 302 and disposition 304, the chat bot tracker system 106 searched the world knowledge 114 to determine if there were any related entities 312 that were categorically one or more level up or down from the spicy tuna roll entity 302 to determine if the chat bot tracker system 106 could infer any dispositions 314 for the chat bot 100 for these related entities 314. In this example, as illustrated in FIG. 3 by the gray colored circles, chat bot tracker system 106 was able to infer dispositions 314 for 6 related entities 312 based on a search of the world knowledge 114 regarding the spicy tuna roll entity 302. For example, the chat bot tracker system 106 determined that the spicy tuna roll entity 302 is a kind of sushi (one category up from spicy tuna roll) and that sushi is a kind of seafood (two categories up from spicy tuna roll). As such, the chat bot tracker system 106 was able to infer dispositions 314A and 314B for the entities of sushi 312A and seafood 312B based on the disposition 304 for spicy tuna roll entity 302. Accordingly, the chat bot tracker system 106 updated the entity-based disposition memory graph to include the entities of sushi 312A and seafood 312B and the inferred dispositions 314A and 314B for these entities 312A and 312B.

Further, in this example, the chat bot tracker system 106 could determine that the main ingredient in a spicy tuna roll entity 302 is salmon (one category down from spicy tuna roll) and that salmon is a kind of seafood (one category up from tuna and two categories up from spicy tuna roll). As such, the chat bot tracker system 106 was able to infer dispositions 314C and 314B for the entities of tuna 312C and seafood 312B based on the disposition 304 for spicy tuna roll entity 302. Additionally, in this example, the chat bot tracker system 106 could determine that the second main ingredient in a spicy tuna roll entity 302 is avocado (one category down from spicy tuna roll) based on the search of the world knowledge 114. As such, the chat bot tracker system 106 was able to infer disposition 314D for the entity of avocado 312D based on the disposition 304 for spicy tuna roll entity 302. Accordingly, the chat bot tracker system 106 updated the entity-based disposition memory graph for the chat bot to include the entities of tuna 312C, seafood 312B, and avocado 312D and the inferred dispositions 314C, 314B, and 314D for these entities 312C, 312D, and 312B.

In some aspects, the user tracker system 112 assigns the same disposition to a related entity 312 of a searched entity 302 that is added to the entity-based disposition memory graph 300 for the chat bot 100. In other aspects, the user tracker system 112 assigns a slightly different disposition to a related entity 312 of a searched entity 302 that is added to the entity-based disposition memory graph 300 for the chat bot 100. In further aspects, since the disposition 314 of the related entity 312 is inferred from a searched entity 302, the user tracker system 112 assigns the same sentiment label and/or emotion label as the search entity 302, but assigns a reduced associated strength to the related entity 312 that is added to the entity-based disposition memory graph 300 for the chat bot 100. The chat bot tracker system 106 and/or the user tracker system 112 may utilized any suitable system, logic, or learning module for determining a sentiment for finding related entities and/or for inferring dispositions for the related entities.

Once the reply has been generated by the reply system 108, the reply system provides the reply to the user 102 and/or client computing device 104 of the user 102. In some aspects, the reply is provided to the user 102 by sending instructions to a client computing device 104 to provide the reply to the user 102. The client computer device 104 may provide the reply to the user 102 via any known suitable output, such as voice, image, text, video, and/or etc. For example, the client computing device 104 may display the reply as text or an image on a user interface of the client computing device 104. In other aspect, the reply is provided to the user 102 by providing the reply via any known suitable output, such as voice, image, text, video, and/or etc.

While all of the examples provided above refer to identifying one entity in a reply or input, the chat bot 100 is capable of identifying multiple entities for one reply or input and capable of assigning a disposition to each identified entity. Further, while all of the examples provided above refer to a single user, the chat bot 100 is capable of providing personality consistent chatting when conversing with multiple users.

Figure 4:
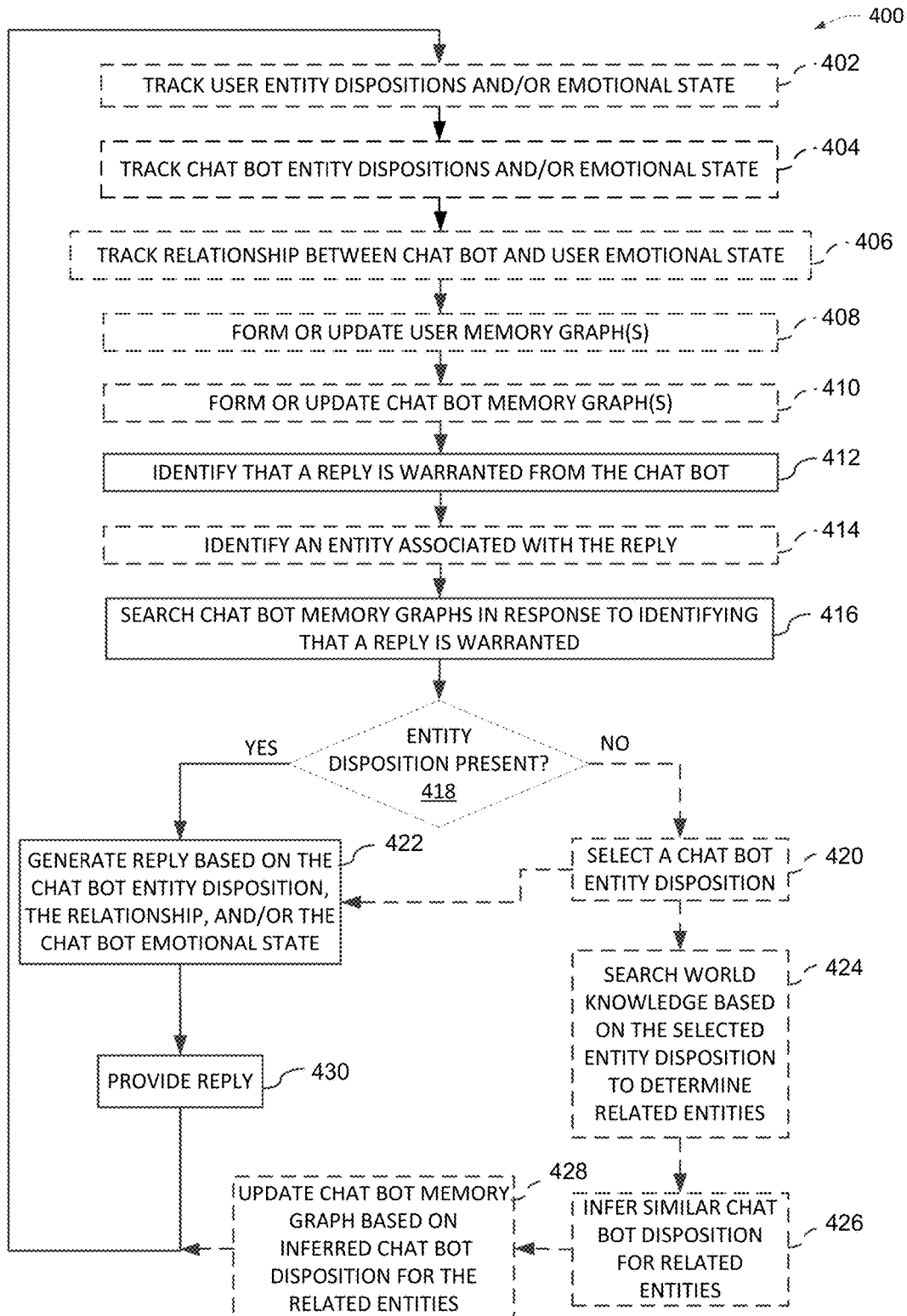
FIG. 4 is block flow diagram illustrating a method for personality consistent automated chatting, in accordance with aspects of the disclosure.

FIG. 4 is a flow diagram conceptually illustrating an example of a method 400 for personality consistent automated chatting. In some aspects, method 400 is performed by the personality consistent chat bot 100 as described above. Method 400 is a method for tracking entity dispositions for a chat bot, emotional states for a chat bot, and/or relationship closeness between a chat bot and a user and providing replies that are consistent with or based on this tracked information. Accordingly, method 400 is a fun, an easy-to-use, an effective, and an engaging method for providing personality consistent automated chatting.

In some aspects, method 400 includes optional operation 402. At optional operation 402, a user entity disposition and/or a user emotional state are tracked. In some aspects, the user entity disposition and/or the user emotional state is tracked based on collected information, such as user information. The user information may include user inputs to the chat bot, user inputs to a client computing device and/or information about the user collected from a search of world knowledge. In some aspects, the collected information includes chat bot replies. In further aspects, at optional operation 402, the user entity disposition and/or the user emotional state may be inferred based on a search of world knowledge with reference to known user information. The user entity disposition and/or a user emotional state may be extracted from the collected information. As new information is collected, the collected information is updated, such as the user information. In some aspects, at optional operation 402, a change in user disposition for an entity or a change in user emotional state is determined or detected based on the updated information. In further aspects, this identified change in user disposition for an entity or change in user emotional state is collected by optional operation 412.

In some aspects, method 400 includes optional operation 404. At optional operation 404, an entity disposition and/or an emotional state for a chat bot is tracked. In some aspects, the entity disposition and/or the emotional state of the chat bot is tracked based on collected chat bot replies at optional operation 404. In further aspects, at optional operation 404, the entity disposition and/or the emotional state for the chat bot may be inferred based on a search of world knowledge in view of a known chat bot entity and its assigned disposition.

In some aspects, method 400 includes optional operation 406. At optional operation 406, a relationship closeness between the chat bot and a user is tracked. In some aspects, the relationship closeness is tracked based on collected user inputs and/or chat bot replies, based on chat frequency between the chat bot and user, duration of chat bot use, and/or intimacy level of topics discussed between the chat bot and the user at optional operation 406. In some aspects, the relationship closeness is an assigned numerical value such as 1-5, 1-10, or 1-20.

Optional operations 402, 404, and 406 may be performed in any order, simultaneously, and/or at overlapping times. As such, FIG. 4 provides one flow example between optional operations 402, 404, and 406.

In some aspects, method 400 includes optional operation 408. Optional operation 408 may be performed after the performance of optional operation 402. At optional operation 408, one or more memory graphs for the user are created, built, and/or updated. The user memory graphs may include a user entity-based disposition memory graph and/or a user emotional state memory graph or log. If the user memory graph is already formed at optional operation 408, the user memory graph is updated based on any new user data collected from optional operation 402. If the user memory graph is not formed at optional operation 408, the user memory graph is formed or built from scratch based on the data collected from optional operation 402. As such, in some aspects, user data from optional operation 402 is collected at optional operation 408.

In further aspects, method 400 also includes optional operation 410. Optional operation 410 may be performed after optional operation 404. At optional operation 410, one or more memory graphs for the chat bot are created, built and/or updated. The chat bot memory graphs may include an entity-based disposition memory graph for the chat bot, an emotional state memory graph or log for the chat bot, and/or a relationship closeness log or graph. If the chat bot memory graph is already formed at optional operation 410, the chat bot memory graph is updated based on any new chat bot data collected from optional operation 404. If the chat bot memory graph is not formed at optional operation 410, the chat bot memory graph is formed or built from scratch based on the chat bot data collected from optional operation 404. As such, in some aspects, chat bot data from optional operation 404 is collected at optional operation 410.

Method 400 includes operation 412. At operation 412, a reply from the chat bot is identified as warranted. The reply may be identified as warranted based on an analysis of prior user inputs and/or chat bot replies at operation 412. At operation 412, any suitable system, method, logic, and/or learning algorithm for determining replies for a conversational chat bot may be utilized by method 400. For example, the automated reply system as disclosed in "Emulating Human Conversations using Convolutional Neural Network-based IR" located at https://arxiv.org/pdf/1606.07056v1.pdf may be utilized by or modified for use with method 400 that is able to track and provide consistent chat bot emotional states and/or chat bot entity dispositions. In further aspects, a change in user disposition for an entity and/or a change in user emotional state are received at operation 412. This change may be evaluated at operation 412 to determine if a chat bot reply is warranted to ask about the detected change in user disposition for an entity and/or a change in user emotional state. In some aspects, operation 412 determines that a reply is warranted to ask about the detected change in user disposition for an entity and/or a change in user emotional state In some aspects, method 400 includes optional operation 414. At optional operation 414, an entity associated with the reply is identified. At optional operation 414, any suitable system, method, logic, and/or learning algorithm may be utilized to identity an entity for the reply. For example, Microsoft entity recognition API (as disclosed at https://www.microsoft.com/cognitive-services/en-us/entity-linking-intelligence-service) could be leveraged or modified to extract entities from a reply for method 400.

Method 400 includes operation 416. At operation 416, one or more chat bot memory graphs, whether preconfigured, newly created, or updated, are searched in response to identifying that a reply is warranted from operation 412. In some aspects, an emotional state memory graph or log for the chat bot is searched at operation 416 for the current emotional state of the chat bot. In further aspects, the relationship closeness log or graph is searched at operation 416 to determine the current relationship closeness between the user the chat bot. In additional aspects, if a first entity is identified during optional operation 414, an entity-based disposition memory graph for the chat bot is searched at operation 416 based on the identified entity to determine the chat bot disposition for the identified entity. In other aspects, operation 416 collects the current emotional state of the chat bot, the current relationship closeness between the user the chat bot and/or the chat bot disposition for a identify entity at operation 416.

In some aspects, method 400 includes an optional operation 418. Optional operation 418 is performed if optional operation 414 is performed. As such, optional operation 418 may be performed if an entity is identified form the reply and an entity-based disposition memory graph for the chat bot is searched at operation 416. At optional operation 418, if the identified entity for the reply is found in the entity-based disposition memory graph for the chat bot, the chat bot disposition for that entity is identified and collected and then operation 422 is selected to be performed. In some aspects, the identified chat bot entity disposition from the entity-based disposition memory graph is based on or inferred based on an entity disposition previously provided by the chat bot to the user in a reply. In other aspects, the identified chat bot entity disposition from the entity-based disposition memory graph is based on an entity disposition that was predetermined and set by the creator of the chat bot. At optional operation 418, if the identified entity for the reply is not found in the entity-based disposition memory graph for the chat bot, the chat bot disposition for that entity is unknown and then optional operation 420 is selected to be performed.

In some aspect, method 400 includes optional operation 420. At optional operation 420, a chat bot entity disposition is selected. In some aspects, the entity disposition is selected at random by the chat bot at optional operation 420. In other aspects, the chat bot entity disposition is selected based on the user disposition for that same entity at optional operation 420. In these aspects, the same or similar disposition for the entity as the user disposition for the entity may be selected at optional operation 420. In alternative aspects, the chat bot entity disposition is selected based on a search of world knowledge at optional operation 420. In these aspects, the chat bot disposition is selected that is similar to the general population disposition for this entity. In further aspects, a chat bot entity disposition is selected that is different from or contrary to the user's and/or the general population's disposition for this entity.

In some aspects, method 400 includes optional operations 424, 426, and 428. At optional operation 424, world knowledge is searched based on the selected entity disposition to determine one or more related entities. For example, a publically available knowledge graph may be searched to determine one or more entities that are categorically related to the entity of the provided chat bot entity disposition. For example, the one or more related entities may be one or more level up or down categorically from the entity in the provided chat bot entity disposition.

After the one or more related entities have been identified at optional operation 424, optional operation 426 is performed. At optional operation 426 similar chat bot disposition are inferred for the one or more related entities based on the provided chat bot entity disposition. In some aspects, the dispositions inferred from the related entities are exactly the same at the provided chat bot entity disposition at optional operation 426. In other aspects at optional operation 426, the dispositions inferred from the related entities are slightly different from the provided chat bot entity disposition, such as having a reduced strength.

After the chat bot dispositions have been inferred for the one or more related entities at optional operation 426, optional operation 428 is performed. At optional operation 428, the entity-based disposition memory graph of the chat bot's memory graphs is updated based on the inferred chat bot dispositions for the one or more related entities. As such, the related entities and inferred dispositions will be saved to the entity-based disposition memory graph and able to be searched and utilized if necessary for generating the next reply.

Method 400 includes operation 422. At operation 422, a reply is generated based on the chat bot entity disposition, the emotional state of the chat bot, and/or the relationship closeness between the user and the chat bot. As such, the chat bot entity disposition, the emotional state of the chat bot, and/or the relationship closeness between the user and the chat bot may be collected at operation 422. In some aspects, the chat bot entity disposition is collected from operations 416 or optional operation 420. In other aspects, the reply is generated based on a detected change in user disposition for an entity and/or a change in user emotional state.

In some aspects, the reply may be generated based also on the user's emotional state and/or the user's entity disposition at operation 422. In these aspects, the user's and the chat bot's information may be combined mathematically in some way, such as averaged. In other aspects, the user's emotional state and/or the user's entity disposition are only utilized to modify the reply if the difference between the chat bot's entity disposition and/or the chat bot's emotional state meets a predetermined threshold. In further aspects, the user's emotional state and/or the user's entity disposition are only utilized to modify the reply after predetermine amount of time and/or predetermine number of replies if the difference between the chat bot's entity disposition and/or the chat bot's emotional state meets a predetermined threshold. As such, in some aspects, chat bot's entity disposition and/or the chat bot's emotional state are changed gradually. In alternative aspects, the user's emotional state and/or the user's entity disposition are not utilized to generate the reply at operation 422.

Next, at operation 430 the reply is provided to user and/or client computing device of the user. In some aspects, at operation 430, the reply is provided to the user by sending instructions to a client computing device to provide the answer to the user. The client computer device may provide the reply to the user via any known suitable output, such as voice, image, text, video, and/or etc. For example, the client computing device may display the answer as text or an image on a user interface at operation 430. In other aspects, the reply is provided to the user via any known suitable output, such as voice, image, text, video, and/or etc. As discussed above, the reply is collected by optional operations 402, 404, and/or 406 and method 400 begins again.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
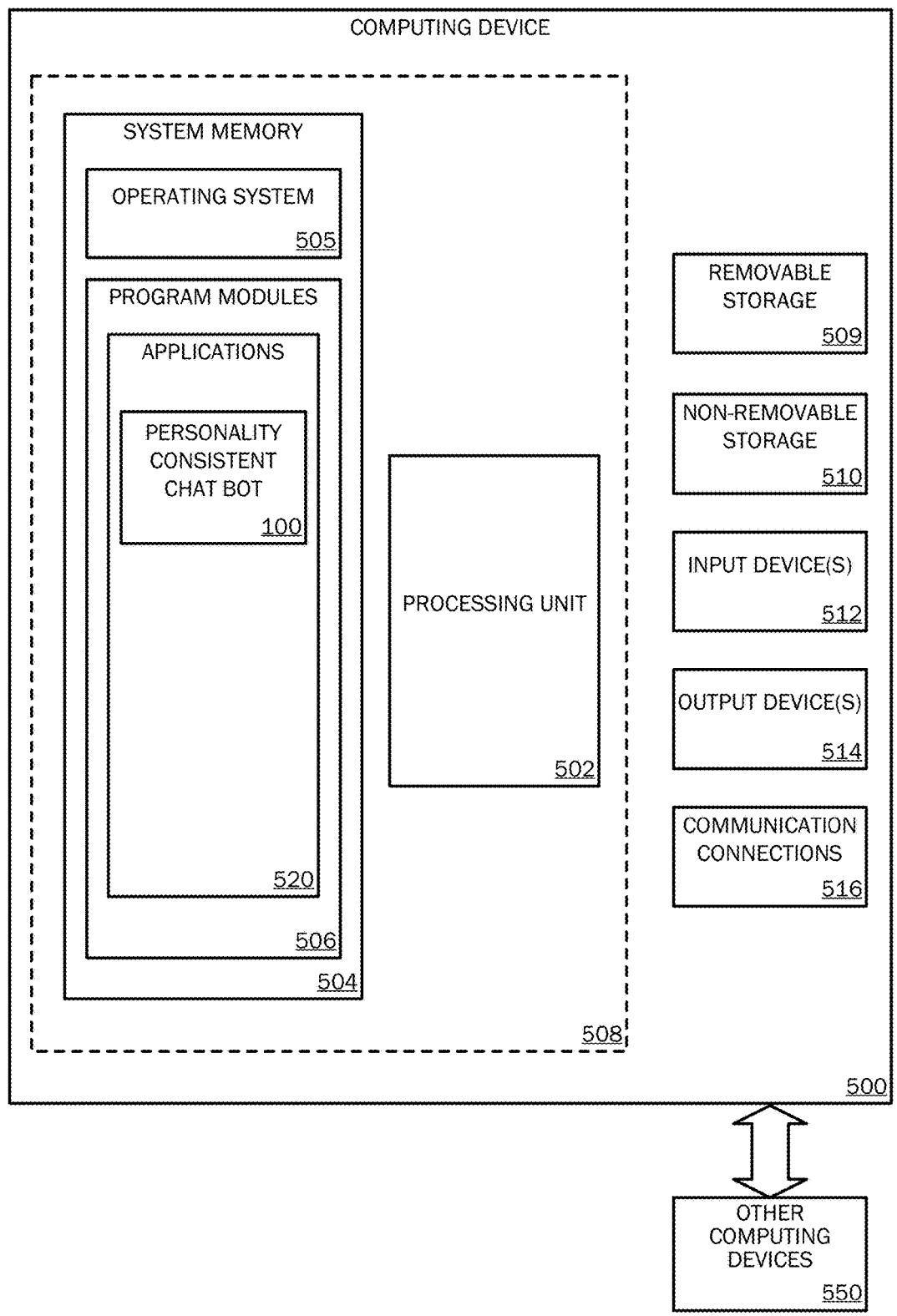
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the personality consistent chat bot 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the personality consistent chat bot 100 that can be executed to employ method 400 for personality consistent automated chatting as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the chat bot tracker system 106, the reply system 108, and/or the user tracker system 112) may perform processes including, but not limited to, performing method 400 as described herein. For example, the processing unit 502 may implement the personality consistent chat bot 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the personality consistent chat bot 100 allows a user to engage in personality consistent chatting during use of one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal. As such the computer storage media is non-transitory.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
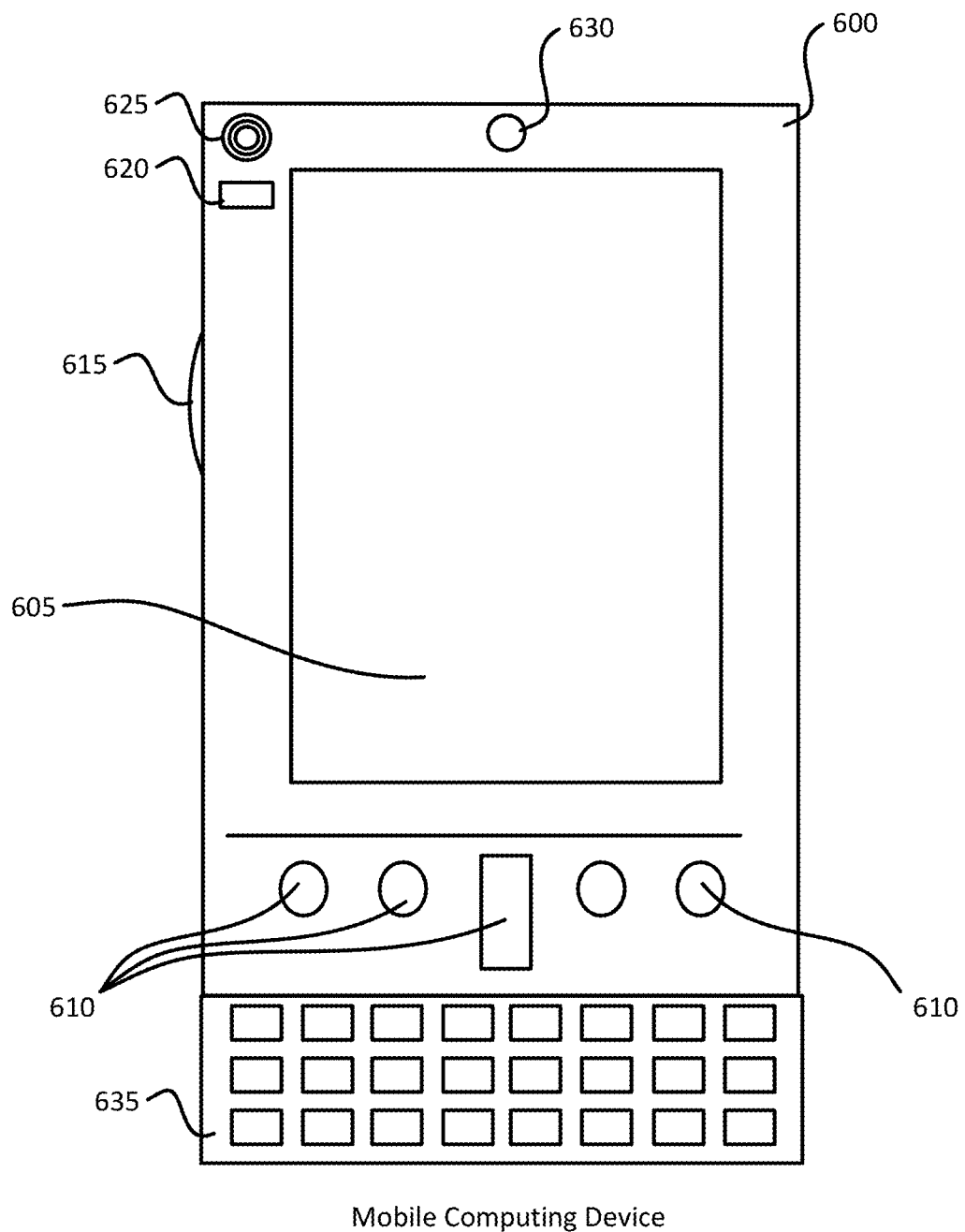
FIG. 6A is a simplified block diagram of a mobile computing device with which various aspects of the disclosure may be practiced.
Figure 6B:
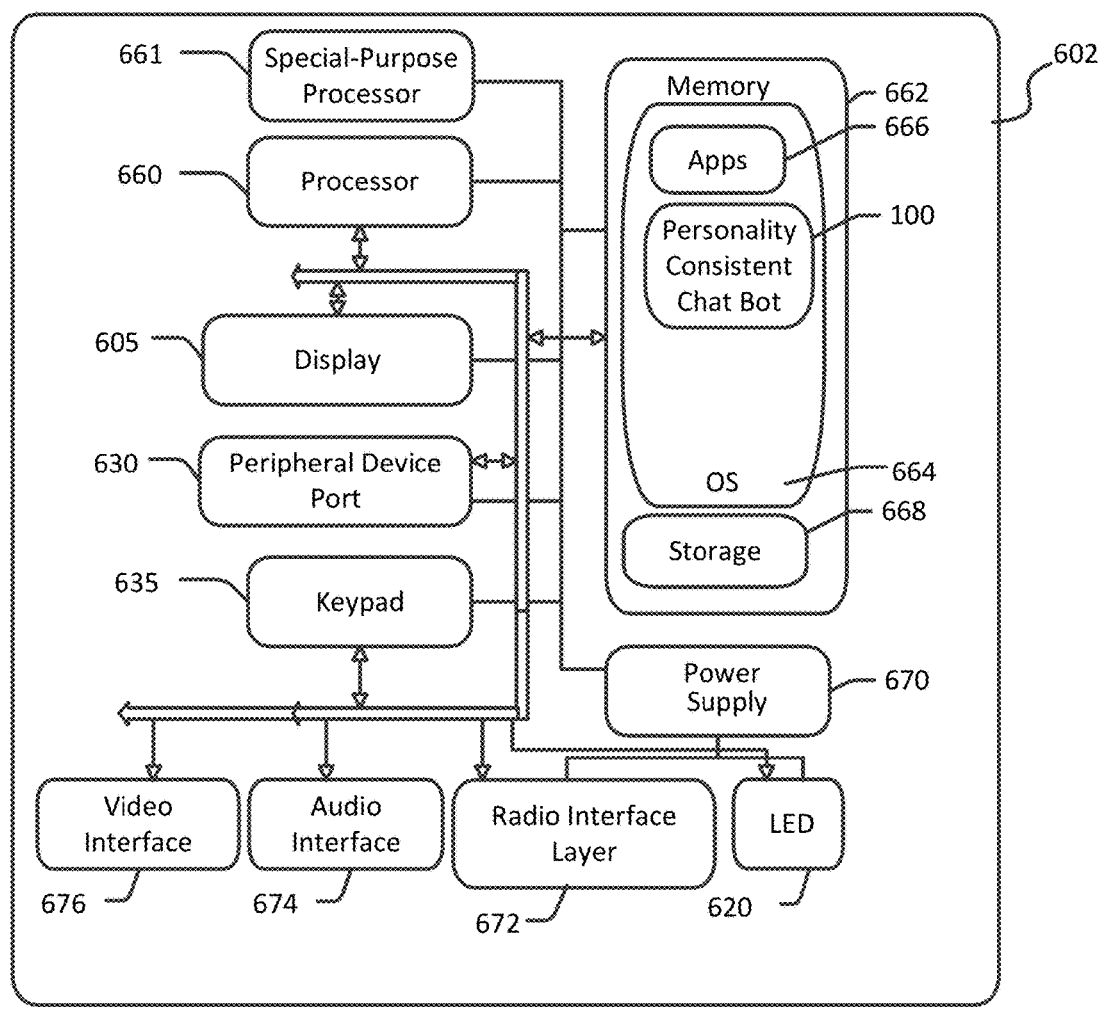
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the personality consistent chat bot 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
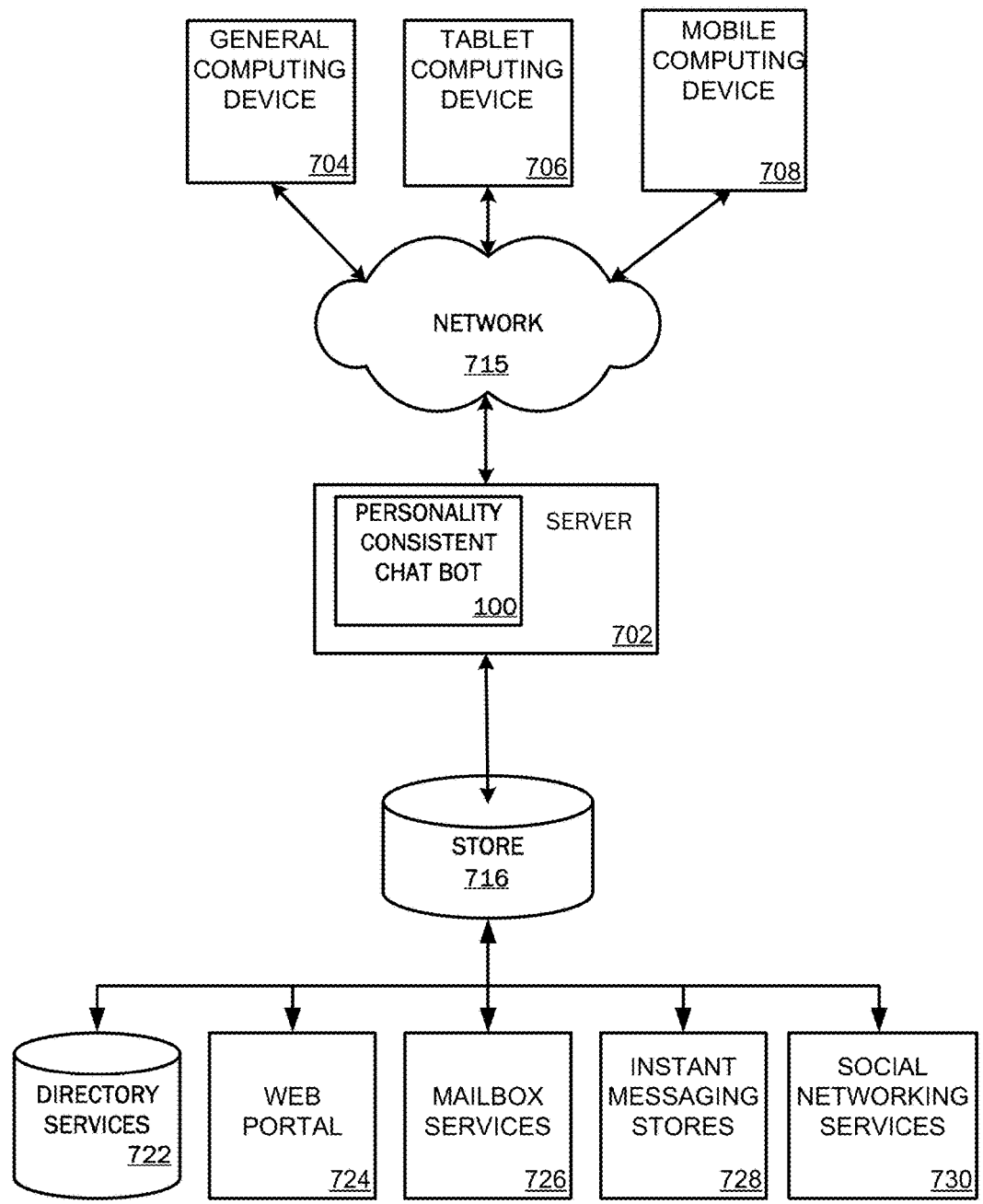
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the personality consistent chat bot 100 may be implemented in a general computing device 704, a tablet computing device 706 and/or a mobile computing device 708 (e.g., a smart phone). In some aspects, the server 702 is configured to implement the personality consistent chat bot 100 via the network 715 as illustrated in FIG. 7.

Figure 8:
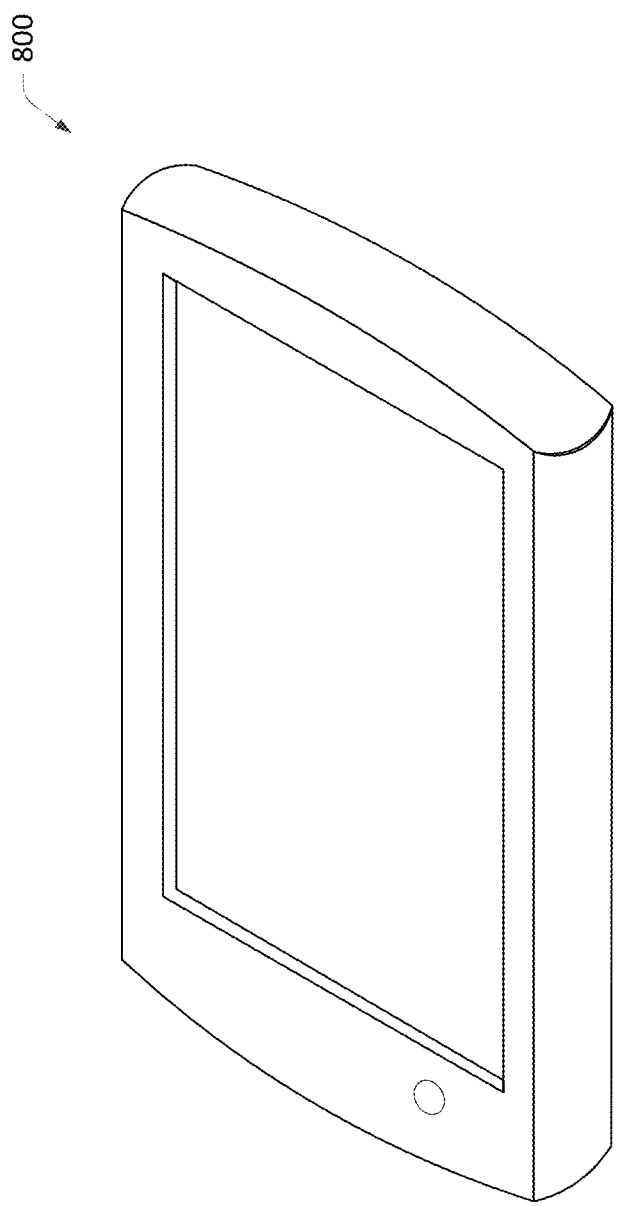
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for a personality consistent chat bot, the system comprising:
   at least one processor; and
   a memory for storing and encoding computer executable instructions that, when executed by the at least one processor is operative to:
      identify that a first reply is warranted from the chat bot regarding a first entity to a user;
      search an entity-based disposition memory graph for the chat bot based on the first entity in response to identifying that the first reply is warranted;
      identify that the entity-based disposition memory graph does not include the first entity;
      extract a user disposition for the first entity from user information in response to identifying that the entity-based disposition memory graph does not include the first entity;
      select a chat bot disposition that is similar to the user disposition for the first entity;
      generate the first reply about the first entity based on the chat bot disposition for the first entity;
      provide the first reply to the user;
      update the entity-based disposition memory graph to include the first entity and the chat bot disposition for the first entity to form an updated entity-based disposition memory graph for the chat bot;
      identify that a second reply is warranted from the chat bot regarding the first entity to the user;
      search the updated entity-based disposition memory graph for the chat bot based on the first entity in response to identifying that the second reply is warranted;
      identify the chat bot disposition for the first entity that was previously provided by the chat bot based on the search of updated entity-based disposition memory graph;
      generate the second reply about the first entity based on the chat bot disposition for the first entity; and
      provide the second reply to the user.

2. The system of claim 1, wherein the at least one processor is further operative to:
   save the user disposition for the first entity to a user entity-based disposition memory graph.

3. The system of claim 2, wherein the at least one processor is further operative to:
   extract the user disposition for the first entity from updated user information in response to identifying that the second reply is warranted from the chat bot regarding the first entity to the user;
   determining that the user disposition for the first entity has changed to form a changed user disposition for the first entity;
   updating the user entity-based disposition memory graph with the changed user disposition for the first entity to form an updated user entity-based disposition memory graph; and
   generate a third reply that asks about the changed user disposition for the first entity.

4. The system of claim 3, wherein the updated entity-based disposition memory graph for the chat bot is maintained and is not changed based on the changed user disposition for the first entity.

5. The system of claim 3, wherein the at least one processor is further operative to:
   determine a difference between the updated user entity-based disposition memory graph and the updated entity-based disposition memory graph for the chat bot for the first entity;
   compare the difference to a threshold;
   determine that the difference meets the threshold;
   modify the updated entity-based disposition memory graph for the chat bot for the first entity to be closer to, but not the same as, the changed user disposition for the first entity after providing at least a fourth reply, a fifth reply, a sixth reply, a seventh reply, and an eighth reply to the user regarding the first entity to form a modified entity-based disposition memory graph for the chat bot.

6. The system of claim 5, wherein the at least one processor is further operative to:
   identify that a ninth reply is warranted from the chat bot regarding the first entity to the user;
   search the modified entity-based disposition memory graph for the chat bot based on the first entity;
   identify a modified chat bot disposition for the first entity based on the searching of the modified entity-based disposition memory graph for the chat bot;
   generate the ninth reply about the first entity based on the modified chat bot disposition for the first entity; and
   provide the ninth reply to the user.

7. The system of claim 1, wherein the user disposition for the first entity includes at least one of a user sentiment, a user emotion, and an associated user strength for the user sentiment or the user emotion; and
   wherein the chat bot disposition for the first entity includes at least one of a chat bot sentiment, a chat bot emotion, and an associated chat bot strength for the chat bot sentiment or the chat bot emotion.

8. The system of claim 1, wherein the at least one processor is further operative to:
   identify that a third reply is warranted from the chat bot regarding a second entity to the user;

search the updated entity-based disposition memory graph for the chat bot based on the second entity in response to identifying that the third reply is warranted;

identify a chat bot disposition for the second entity based on the searching of the updated entity-based disposition memory graph;

generate the third reply about the second entity based on the chat bot disposition for the second entity; and provide the third reply to the user.

9. A method for automated chatting with personality consistency, the method comprising:

identifying that a first reply is warranted from a chat bot regarding a first entity to a user;

searching an entity-based disposition memory graph for the chat bot based on the first entity;

identifying a chat bot disposition for the first entity that was previously provided by the chat bot based on the searching of the entity-based disposition memory graph for the chat bot;

generating the first reply about the first entity based on the chat bot disposition for the first entity; and providing the first reply to the user.

10. The method of claim 9, further comprising:

collecting at least one of user input and user information for a second entity;

extracting a user disposition for the second entity from at least one of the user input and the user information for the second entity;

selecting a similar chat bot disposition for the second entity for the chat bot;

saving the similar chat bot disposition for the second entity for the chat bot to the entity-based disposition memory graph for the chat bot;

identifying that a second reply is warranted from the chat bot regarding the second entity to the user;

searching the entity-based disposition memory graph for the chat bot based on the second entity;

identifying the similar chat bot disposition for the second entity based on the searching of the entity-based disposition memory graph for the chat bot;

generating the second reply about the second entity based on the similar chat bot disposition for the second entity; and providing the second reply to the user.

11. The method of claim 9, further comprising:

searching world knowledge based on the first entity;

determining a related entity to the first entity that is categorically at least one level up from the first entity, wherein the related entity is a second entity;

inferring a similar chat bot disposition for the second entity based on the chat bot disposition for the first entity;

saving the similar chat bot disposition for the second entity to the entity-based disposition memory graph for the chat bot;

identifying that a second reply is warranted from the chat bot regarding the second entity to the user;

searching the entity-based disposition memory graph for the chat bot based on the second entity;

identifying the similar chat bot disposition for the second entity based on the searching of the entity-based disposition memory graph for the chat bot;

generating the second reply about the second entity based on the similar chat bot disposition for the second entity; and providing the second reply to the user.

12. The method of claim 9, wherein the chat bot disposition for the first entity includes at least one of a chat bot sentiment, a chat bot emotion, and an associated chat bot strength for the chat bot sentiment or the chat bot emotion.

13. The method of claim 9, wherein the entity-based disposition memory graph for the chat bot includes entities labeled with at least one of sentiments, emotions, and strengths that are predetermined during creation of the chat bot.

14. The method of claim 9, further comprising:

tracking a relationship closeness between the chat bot and the user;

wherein the generating the first reply about the first entity is further based on the relationship closeness between the chat bot and the user.

15. The method of claim 9, further comprising:

tracking an emotional state of the chat bot;

wherein the generating the first reply about the first entity is further based on the emotional state of the chat bot.

16. A system for a personality consistent chat bot, the system comprising:

at least one processor; and a memory for storing and encoding computer executable instructions that, when executed by the at least one processor is operative to:

track an emotional state of the chat bot;

form an emotional state memory graph for the chat bot based on the tracking of the emotional state of the chat bot;

identify that a reply is warranted from a chat bot;

search the emotional state memory graph for the chat bot in response to identifying that the reply is warranted;

identify a current emotional state of the chat bot based on the searching of the emotional state memory graph;

generate the reply based on the current emotional state of the chat bot; and provide the reply to a client computing device.

17. The system of claim 16, wherein the at least one processor is further operative to:

track a user emotional state;

wherein generating the reply is further based on the user emotional state.

18. The system of claim 17, wherein the at least one processor is further operative to:

track chat bot dispositions about different entities as provided in replies by the chat bot;

form an entity-based disposition memory graph for the chat bot based on the tracking of the chat bot dispositions for the different entities;

identify that the reply relates to an entity;

search the entity-based disposition memory graph for the chat bot for the entity;

identify a chat bot disposition associated with the entity based on the search of the entity-based disposition memory graph for the chat bot;

wherein generating the reply is further based on the chat bot disposition for the entity.

19. The system of claim 18, wherein the chat bot dispositions for the different entities include a chat bot emotion and an associated strength for the chat bot emotion.

20. The system of claim 17, wherein the user emotional state is at least one of:

happy, sad, angry, neutral, healthy, sick, disgust, contempt, fear, excitement, mature, and immature.

\* \* \* \* \*